Oct. 7, 1969 SHUZO FUKADA ET AL 3,470,942
MICROWAVE HEATING APPARATUS AND METHOD
Filed Dec. 8, 1967 2 Sheets-Sheet 1

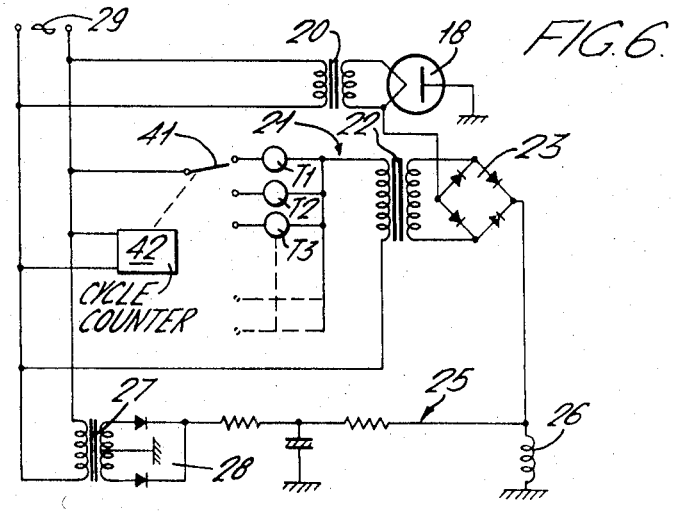
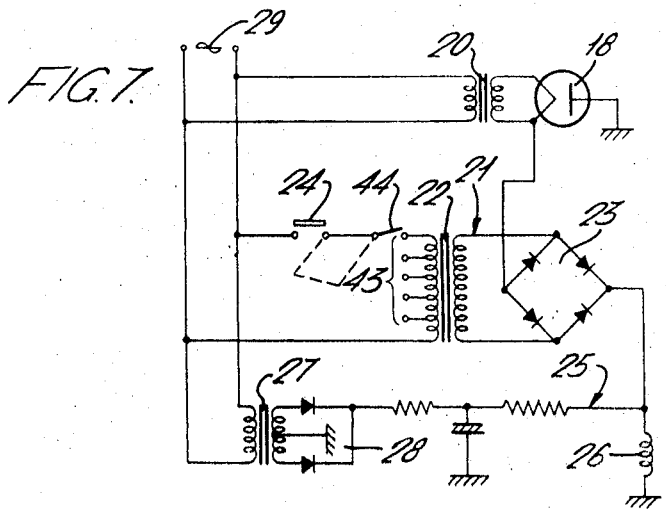
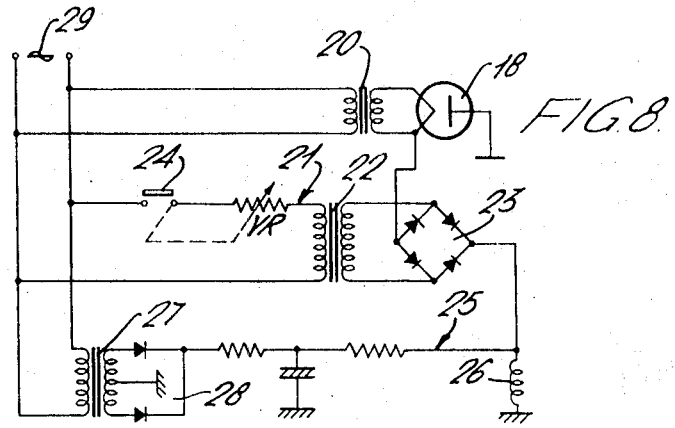

United States Patent Office 3,470,942
Patented Oct. 7, 1969

3,470,942
MICROWAVE HEATING APPARATUS AND
METHOD
Shuzo Fukada, Kyoto-to, and Takayoshi Kido and Hirotugu Hurutate, Osaka, Japan, assignors to Sanyo Electric Co., Ltd., Osaka, Japan, a corporation of Japan
Filed Dec. 8, 1967, Ser. No. 689,094
Claims priority, application Japan, Dec. 10, 1966, 41/81,186
Int. Cl. F28d 21/00; F27b 17/00
U.S. Cl. 165—2        11 Claims

ABSTRACT OF THE DISCLOSURE

A microwave heating apparatus in which the irradiation of frozen bodies with microwave energy is carried out either continuously or intermittently within an atmosphere which is always maintained at a cold condition during the irradiation operation. A microwave heating apparatus in which the irradiation of frozen bodies with microwave energy is carried out within an inert gas atmosphere.

---

The invention relates to microwave heating apparatus, and more particularly to an electronic oven for effecting the defrosting or thawing of frozen foods by irradiating the foods with microwave energy having a frequency of the order of 915 or 2450 megacycles per second.

Generally, it is known to defrost or thaw frozen foods by irradiating them with microwave energy. However, nonuniformity of distribution of microwave energy into nonuniform frozen foods causes nonuniform heating which results in defrosting local regions or denaturing of such regions so that the flavor of the foods is spoiled and/or rot occurs. Further, in heating such foods with microwave energy, since the temperature rises more quickly in the outer surface of the foods than in the inner central portion thereof, the outer surface is defrosted more quickly than in the interior, with the result that the interior of the food is maintained as not defrosted and the surface alone is defrosted. Therefore, the surface region becomes discolored or rotten. In addition, as the surface region of the food is defrosted to produce water, as mentioned above, since the dielectric loss of water is several times as high as that of ice, once the surface is defrosted the surface is heated much more quickly than the interior.

An object of the invention, therefore, is to provide a microwave heating apparatus for enabling substantially uniform heating of nonuniform dielectric bodies such as frozen foods to defrost them uniformly throughout and in a short time with the result that the flavor of foods is maintained as it is and neither rotting nor discoloring occurs so that consumers may be furnished with fresh foods.

Another object of the invention is to provide a microwave heating apparatus for uniformly defrosting frozen foods in an inert gas atmosphere so that respiratory function of frozen foods which might cause discoloring may be prevented during the defrosting operation.

The microwave heating apparatus according to the invention comprises a metallic enclosure forming a cavity for reception of a body to be heated, means for irradiating with microwave energy said body in said cavity, and means cooling the surface of said body while the irradiation with microwave energy proceeds. In a preferred embodiment of the invention, the body to be heated is intermittently irradiated with microwave energy. The temperature of the atmosphere in the cavity is preferably maintained within the range of 0° C. to −30° C. by such cooling means. In case where irradiation with microwave energy is either intermittently or continuously carried out, the intensity of microwave energy may be gradually attenuated and in case of intermittent irradiation the irradiation time is preferably, stepwise shortened.

In another embodiment of the invention, means is provided for supplying an inert gas into the cavity for reception of frozen foods to maintain the cavity for reception of frozen foods to maintain the cavity in an inert gas atmosphere during the defrosting operation. This can be achieved by supplying a cold inert gas into the cavity. If Dry Ice or liquid nitrogen is used as the inert gas supply, no particular cooling means for maintaining the cavity in a cold atmosphere is required.

Other objects, advantages and features of the invention will be apparent from the following descriptions of some embodiment thereof with reference to the accompanying drawings, in which:

FIGURES 6 to 8 are electric diagrams of various modified embodiments of the invention.

Figure 1:
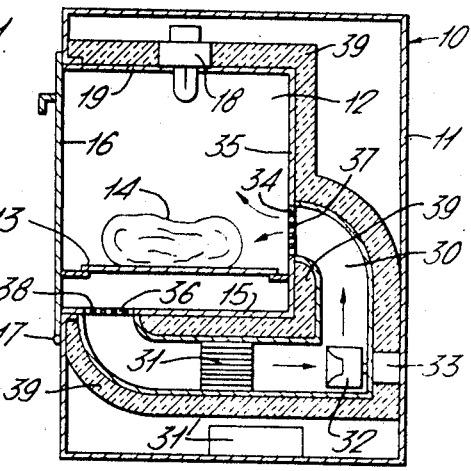
FIGURE 1 is a diagrammatically sectional view of a microwave oven embodying the invention.

Referring to FIGURE 1, there is illustrated a microwave oven 10 comprising an outer casing 11 including a microwave heating compartment 12 which forms a cavity for reception of dielectric bodies to the heated, e.g., frozen foods. Walls defining the compartment 12 are made of a suitable metal such as stainless steel. A tray 13 on which a body to be heated is deposited is placed inside the compartment 12 at a position spaced from the bottom wall or floor 15 of the compartment 12. Access to the interior of the microwave heating compartment may be obtained by means of a hinged door 16 which forms the front wall of the compartment 12. The reference numeral 17 indicates a hinge for pivotally carrying the door 16 for its opening and closing.

Microwave energy having a frequency of the order of 915 to 2450 megacycles per second is derived from a suitable source, such as a magnetron 18 which is mounted on the top wall 19 of the compartment 12 so as to irradiate the body 14. The magnetron 18 may be of any known type.

Figure 2:
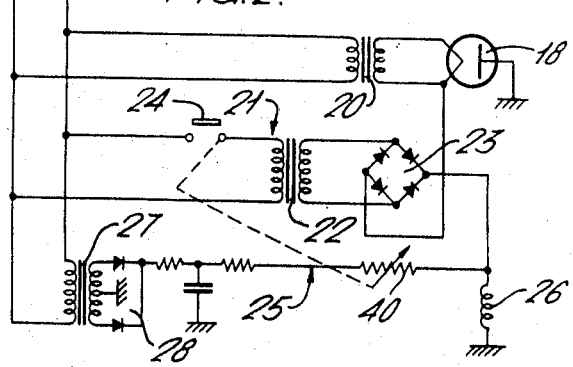
FIGURE 2 is an electric circuit diagram of an embodiment of the invention.

An electric circuit diagram is shown by way of example in FIGURE 2. In FIGURE 2, the reference numeral 20 designates a heater transformer for heating the heater of the magnetron 18 and the reference numeral 21 designates a high voltage circuit for applying a high voltage to the magnetron 18, said circuit including a high voltage transformer 22 and a full-wave rectifier 23. The reference numeral 24 designates timing means placed in said high voltage cirruit 21 and adapted to be repeatedly moved between into ON and OFF positions to intermittenly pass electric supply to the magnetron 18 and hence intermittently generates microwaves. The timing means is so set that as the defrosting proceeds the ON time is gradually decreased. The numeral 25 designates a field circuit for feeding the magnetron 18 with a magnetic field, including a field coil 26, a field transformer 27 for feeding the same with the exciting current, and a rectifying circuit 28. 29 denotes AC power supply source.

According to the invention, the microwave oven 10 is provided therein with cooling means for maintaining the cavity inside the compartment 12 in a cold atmosphere. Preferably, the atmosphere is maintained at a temperature at least 30° C. lower than the room temperature. Actually, it may be kept at a temperature within the range of 0° C. to —30° C. Such a cold atmosphere as described may be obtained by introducing cold gas, e.g., cooled air into the compartment 12. In FIGURE 1, the reference numeral 30 indicates a cooled air recirculating passage including an evaporator 31 as a heat exchanger and a blower 32 driven by a motor 33. The cooled air recirculating passage 30 communicates at its opposite ends with the inside of the compartment 12. The reference numeral 34 indicates the inlet of cooled air which is opened in the rear wall 35 of the compartment 12 and 36, the outlet of air to be cooled which is opened in the bottom wall 15 of the compartment 12. The inlet 34 is placed in such a position that the body 14 to be heated can be directly blown by cooled air supplied through the passage 30. These two apertures 34 and 36 are covered by perforated metallic plates 37 and 38 respectively, so that dispersion of microwave energy to the outside may be prevented. The evaporator 31 cooperates with a refrigerant compressor (not shown) and a condenser (not shown) for cosdensing hot gas discharged from the compressor to form a known refrigerant circuit. The cooling unit 31' including a refrigerant compressor and a condenser is located below the cooled air recirculating passage 32 within the casing 10. The compartment 12 and the passage 30 are covered by a heat insulating material 39 such as polyurethane foam.

Figure 3:
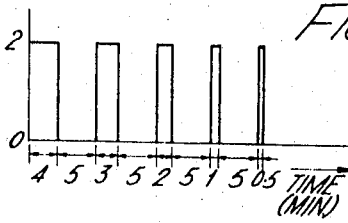
FIGURES 3 to 5 are diagrams for showing some preferred examples for the relation between the time and the intensity of the microwave with which the body to be heated is irradiated.

The defrosting operation of a frozen food utilizing the apparatus illustrated in FIGURES 2 and 3 is as follows:

A frozen food 14 is deposited on the tray 13 in the cavity of the compartment 12 and the magnetron 18 is operated by a known method to irradiate the frozen food 14 with microwave energy having the frequency described before. At the same time, cooling means is operated to blow cold air through the inlet 34 to the food 14 and timing means 24 placed in the high voltage circuit 21 is set. Timing means 24 switches the high voltage circuit 21 alternately on-off-on so that the generation of microwaves is rendered intermittently. Further, as described above, the intermittent time is such that whereas the OFF time is constant (this means regular intervals), the ON time gradually decreases in length, e.g., first 5 minutes, then 4 minutes and so on. Therefore, the frozen food 14 is intermittently irradiated with microwave energy with the irradiating time gradually decreasing as the defrosting proceeds and on the other hand the rise in the surface temperature of the food 14 is suppressed by cold air during the stoppage of the generation of microwave energy. Local defrosting and any nonuniform increase in the temperature which might be caused during irradiation are alleviated by the cold air so that decoloration, spoiling of flavor, rot, etc. do not occur. Moreover, according to the invention, since the irradiating time is made longer in the initial period and gradually decreased as the defrosting proceeds, and because of the cold atmosphere, the defrosting can be carried out uniformly throughout the initial, middle and last periods. That is, since the temperature of the food rises as the defrosting proceeds, if the intermittently irradiating time is constant throughout the whole defrosting operation, in the middle and last periods of the defrosting, only the surface which has already been defrosted will be further heated (because, in case that the surface alone is first defrosted and hence contains, the dielectric loss of water is higher than that of ice) while the interior will not be defrosted, the net result being discoloration, rot, etc. However, according to the invention, since the irradiating time is decreased as the defrosting proceeds, as mentioned above, there occurs no such phenomenon so that uniform defrosting is assured.

Figure 4:
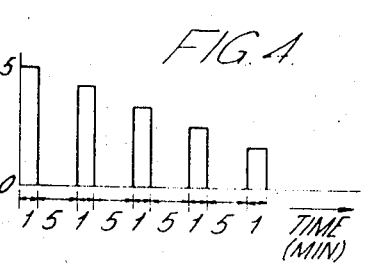
Figure 5:
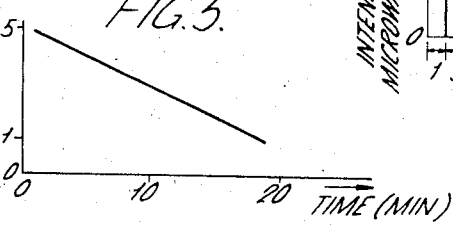

The relation between the irradiating time and the interrupting time is shown by way of example in FIGURES 3 to 5. In FIGURES 3 to 5, time is plotted on the horizontal axis in minutes and the intensity of microwave energy on the vertical axis in kw. Referring particularly to FIGURE 3, in case that the intensity of microwave is 2 kw., the interrupting time is constant, 5 minutes, and the irradiating time is gradually decreased, 4 minutes, 3 minutes, 1 minute and so on. In this case, the numerical values shall be optionally changed according to the size and volume of the frozen and the defrosting conditions.

In FIGURE 2 a variable resistor 40 is placed in the field circuit 25. The variable resistor 40 is operatively associated with the action of the timing means 24, placed in the high voltage circuit 21 so as to be gradually increased in resistance value to decrease the exciting current flowing through the field coil 26, thereby to decrease the intensity of a magnetic field presented to the magnetron 18. As a result, the intensity of microwave energy emitted from the magnetron 18 is gradually attenuated while microwave energy is being radiated to the frozen food. In this case, the timing means 24 is so adapted as to be able to set the irradiating time, e.g., at 1 minute and the interrupting time at 5 minutes, as shown in FIGURE 4. Further, during the interrupting time, i.e. during the time when the timing means 24 is in its OFF position, the variable resistor 40 is operated to increase the resistance value, whereby the output of the magnetron 18, or the intensity of microwave energy is gradually attenuated, 5 kw., 4 kw. and so on. Irrespective of the on-and-off operation of the timing means, the resistance value may be continuously varied in operative association with the action of said means. In this case the cavity is of course maintained in a cold atmosphere and as for effectiveness attained, it is similar to that attained by gradually decreasing the irradiating time as previously mentioned.

In a further embodiment of the invention, similar effectiveness may be attained continuously attenuating the intensity of microwave energy without rendering the irradiation intermittent, as shown in FIGURE 5. In this case also, the vacity is maintained in a cold atmosphere. That is, if the frozen food is small and thin, it will meet the purpose only to atenuate the intensity of microwave energy without rendering the irradiation intermittent.

The intermittent irradiation in such a manner as shown in FIGURE 3 may also be obtained by varying the time during which an electrical voltage is applied to the anode of the magnetron. The circuit system for this purpose is shown by way of example in FIGURE 6. In FIGURE 6 like elements are indicated by the same reference numerals as used in FIGURE 2. The high voltage circuit 21 includes a number of timers $T_1$, $T_2$, $T_3$, and so on which are connected in parallel so as to be selectively and successively placed in a closed circuit 21 including the AC voltage source 29 and the first winding of the transformer 22. The reference numeral 41 indicates switch means for selectively inserting one of the timers $T_1$, $T_2$, $T_3$ . . . at a time in the circuit 21. Since the timers $T_1$, $T_2$, $T_3$ . . . have different holding times, different irradiating times can be obtained according as the switch means 41 places successively and selectively those timers in the circuit 21. The reference numeral 42 indicates a cycle counter for controlling switch means 41 in such a manner that it places the timers $T_1$, $T_2$, $T_3$ . . . in the circuit 21 selectively and in its order per cycle.

Another means for obtaining an intermittent irradiation in such a manner as shown in FIGURE 4 is illustrated in FIGURE 7. In FIGURE 7 like elements are indicated by the same same reference numerals as used in FIGURE 2. The high voltage circuit 21 illustrated in FIGURE 7 includes a plurality of taps 43 which are connected to different positions of the first winding of the transformer 22 and a switch contact 44 which is operated so as to become selectively and successively in contact with said taps 43. The movement of the switch contact 44 is interconnected with the operation of timing means 24. In this manner irradiation with microwave energy is intermittently given by the operation of timing means 24 and the intensity of microwave energy is controlled so as to be attenuated step by step as shown in FIGURE 4.

FIGURE 8 illustrates a further means for obtaining an intermittent irradiation in such a manner as shown in FIGURE 4. Like elements are indicated by the same reference numerals as used in FIGURE 2. In the embodiment illustrated in FIGURE 8, the current supplied to the anode of the magnetron 18 is controlled by a volume control means $V_R$ inserted in the high voltage 21. The volume control means $V_R$ is interconnected with the timing means 24.

Some examples for defrosting various frozen foods utilizing the apparatus according to the invention are given hereinbelow.

Example 1

Five frozen loin pieces of pork are prepared, each having a volume of 53 x 14 x 5 cm.$^3$ and a weight of 16.5 kg. The temperature of the loin pieces at their interior portions was —25° C. Irradiation with microwave energy having a frequency of the order of 2450 megacycles per second is intermitently carried out. Five times of 40 seconds irradiation were carried out with regular intervals each of 140 seconds until the temperature of the pork pieces at their interior portions reaches —5° C. The atmosphere in which the microwave heating was carried out was maintained at —10° C. by blowing cold air into the cavity in the compartment. Substantially uniform heating throughout the whole volume was obtained without causing local rotting or discoloring.

Example 2

The frozen chickens are prepared having a weight of 800 g. The initial temperature of each of the chickens at its interior portions was —25° C. Irradiation with microwave energy having a frequency of the order of 2450 megacycles per second is intermittently carried out. Three times of 60 second irradiation were carried out with regular intervals each of 120 seconds until the temperature of each of the chickens at its interior portions reaches —5° C. The atmosphere in which the microwave heating was carried out was maintained at —10° C. by blowing cold air into the cavity in the compartment. Substantially uniform heating throughout the whole volume was obtained without causing local rotting or discoloring.

Example 3

A mass of cuttlefishes frozen in a rectangular plate having a weight of 7.5 kg. and a volume of 30 x 40 x 7 cm.$^3$ is prepared. Initial temperature of the frozen cuttlefish mass was —15° C. Irradiation with microwave energy having a frequency of the order of 2450 megacycles per second is intermittently carried out. 20 second irradiation was repeated nine times with regular intervals each of 40 seconds until the temperature of the cuttlefish mass reaches —3° C. The atmosphere in which the microwave heating was carried out was maintained at —10° C. by blowing cold air into the cavity in the compartment. Substantially uniform heating throughout the whole volume was obtained without causing local rotting or discoloring.

Example 4

A frozen salmon mass having a weight of 10 kg. and a volume of 40 x 60 x 7 cm. was prepared. The initial temperature was —15° C. Irradiation with microwave energy having a frequency of the order of 2450 megacycles per second is intermittently carried out. 20 second irradiation was repeated nine times with regular intervals each of 40 seconds and then 10 second irradiation was repeated five times with regular intervals each of 50 seconds until the temperature of the salmon mass reaches —2° C. The atmosphere in which the microwave heating was carried out was maintained at —10° C. by blowing cold air into the cavity in the compartment. Substantially uniform heating throughout the whole volume was obtained without causing local rotting or discoloring.

In a preferred embodiment of the invention, the frozen foods are protected in an inert gas atmosphere during the defrosting operation. This can be achieved by introducing inert gas such as nitrogen or carbon dioxide into the compartment in which irradiation of the frozen foods with microwave energy is carried out. In utilizing the apparatus illustrating in FIGURE 1, the passage 30 for supplying cooled air into the compartment 12 may be replaced by a suitable means for supplying cold inert gas to the compartment, which means may comprise an inert gas source, means for cooling inert gas and a fan for blowing cooled inert gas. If a liquid nitrogen bombe or a solid carbon dioxide mass known as "Dry Ice" is used for the inert gas source, no cooling means is required.

Protection of frozen foods with the above mentioned inert gas atmosphere from exposure to the air suspends any respiration of the frozen goods during the defrosting operation. For example, in case of defrosting meat, discoloring due to exposure of hemoglobin to the air can be prevented and accordingly, the foods can be defrosted without loosing freshness.

As fully described above, the invention is capable of defrosting any kind of frozen foods uniformly without irregularities in defrosting and in a short time. Therefore, it can maintain the flavor of foods as it is and present consumers with fresh foods.

What we claim is:

1. A microwave heating apparatus comprising an enclosure forming a cavity for reception of a body to be heated, means for irradiating with microwave energy the body in said cavity, and means for cooling the surface of said body by a sufficient amount while said body is irradiated with microwave energy to reduce the dielectric losses at said surface.

2. A microwave heating apparatus as defined in claim 1, in which said irradiating means reduces the quantity of microwave energy with which the body to be heated as a function of time as the irradiation with microwave energy proceeds.

3. A microwave heating apparatus as defined in claim 1, in which said body is intermittently irradiated with said microwave energy.

4. A microwave heating apparatus as defined in claim 2 in which the quantity of microwave energy to be radiated is gradually reduced.

5. A microwave heating apparatus as defined in claim 3, in which the microwave energy radiation time is stepwise shortened.

6. A microwave heating apparatus as defined in claim 1, further including means for supplying an inert gas into said cavity to maintain said cavity in an inert gas atmosphere.

7. A microwave heating apparatus as defined in claim 1, in which said cooling means comprises means for supplying a cold inert gas into said cavity.

8. A microwave heating apparatus as defined in claim 3 in which the intensity of energy used to irradiate the body is decreased in successive irradiation steps.

9. A microwave heating apparatus as in claim 1 in which said cooling means maintains the cavity at a temperature in the range of subtsantially that or below the freezing point of water.

10. The method of thawing frozen foods comprising the steps of placing a food body within an enclosure, irradiating said body with energy in the microwave range, and maintaining the outer surface of said food body at a cooled temperature to reduce the dielectric losses on the surface of the body.

11. The method of claim 10 wherein the temperature on the surface of the food is maintained in the range substantially at or below the freezing point of water.

References Cited

UNITED STATES PATENTS

| | | | |
|---|---|---|---|
| 3,180,403 | 4/1965 | Breen | 165—30 |
| 3,183,683 | 5/1965 | Reiter et al. | 62—78 |
| 3,261,394 | 7/1966 | Foster et al. | 165—30 |
| 3,282,331 | 11/1966 | Foster et al. | 165—30 |
| 3,366,769 | 1/1968 | Lima | 219—10.55 |

ROBERT A. O'LEARY, Primary Examiner

C. SUKALO, Assistant Examiner

U.S. Cl. X.R.

62—78; 165—12, 17, 30; 219—10.55